United States Patent
Carlough et al.

(10) Patent No.: US 8,495,124 B2
(45) Date of Patent: Jul. 23, 2013

(54) DECIMAL FLOATING POINT MECHANISM AND PROCESS OF MULTIPLICATION WITHOUT RESULTANT LEADING ZERO DETECTION

(75) Inventors: Steven R. Carlough, Wappingers Falls, NY (US); Adam B. Collura, Hyde Park, NY (US); Michael Kroener, Ehningen (DE); Silvia Melitta Mueller, Altdorf (DE)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 12/821,648

(22) Filed: Jun. 23, 2010

(65) Prior Publication Data
US 2011/0320512 A1    Dec. 29, 2011

(51) Int. Cl.
*G06F 7/52* (2006.01)

(52) U.S. Cl.
USPC ........... 708/623; 708/205; 708/209; 708/523; 708/551; 708/624

(58) Field of Classification Search
None
See application file for complete search history.

(56) References Cited

U.S. PATENT DOCUMENTS

| 3,644,724 | A | * | 2/1972 | Angelov et al. | 708/624 |
| 4,745,569 | A | * | 5/1988 | Yamaoka et al. | 708/623 |
| 5,623,683 | A | * | 4/1997 | Pandya | 708/625 |
| 6,353,843 | B1 | * | 3/2002 | Chehrazi et al. | 708/631 |
| 6,360,189 | B1 | * | 3/2002 | Hinds et al. | 703/2 |
| 7,519,647 | B2 | | 4/2009 | Carlough et al. | |
| 2005/0010631 | A1 | * | 1/2005 | Carlough et al. | 708/624 |

* cited by examiner

*Primary Examiner* — Michael D Yaary
(74) *Attorney, Agent, or Firm* — John E. Campbell

(57) ABSTRACT

A decimal multiplication mechanism for fixed and floating point computation in a computer having a coefficient mechanism without resulting leading zero detection (LZD) and process which assumes that the final product will be M+N digits in length and performs all calculations based on this assumption. Least significant digits that would be truncated are no longer stored, but retained as sticky information which is used to finalize the result product. Once the computation of the product is complete, a final check based on the examination of key bits observed during partial product accumulation is used to determine if the final product is truly M+N digits in length, or M+N−1 digits. If the latter is true, then corrective final product shifting is employed to obtain the proper result. This eliminates the need for dedicated leading zero detection hardware used to determine the number of significant digits in the final product. The corrective final product shifting also incorporates adjustments to the coefficient of the product when the product's exponent is at its extremes and the final product must be brought to be within the precision and range of a given format.

20 Claims, 2 Drawing Sheets

DECIMAL FLOATING POINT MECHANISM AND PROCESS OF MULTIPLICATION WITHOUT RESULTANT LEADING ZERO DETECTION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a decimal multiplication mechanism for fixed and floating point mechanism of a computer and particularly to a system and method of multiplication without resulting leading zero detection (LZD) using the decimal multiplication mechanism.

2. Description of Background

Before our invention we developed a system for IBM for performing multiplication on decimal data including input registers for inputting a multiplier and a multiplicand. The multiplier included one or more digits. The system also included one or more two cycle adders and mechanism. The mechanism received the multiplier and the multiplicand into the input registers. With this mechanism, a running sum then is reset to zero. The mechanism also performs for each of the digits in the multiplier in order from least significant digit to most significant digit: creating a partial product of the digit and the multiplicand; and adding the partial product to the running sum using the two cycle adders. When the loop is completed for each of the digits in the multiplier, the mechanism outputs the running sum as the result. This process however must build in hardware support to account for the fact that a multiplication of a multiplier of N digits in length by a multiplicand of M digits in length yields a product of either M+N or M+N−1 digits in length. Because of this, they must post process the infinitely precise result and select the appropriate value for the final product. Such mechanisms often maintain unnecessary least significant digits which will be truncated in the final result. They also require additional hardware such as leading zero detection circuits to accurately determine the final number of significant digits in the product. Such an example of this approach is U.S. Pat. No. 7,519,647 issued Apr. 14, 2009, entitled "System and Method for Providing a Decimal Multiply Algorithm Using a Double Adder" naming Carlough et. al. inventors and assigned to IBM. This U.S. Pat. No. 7,519,647 including its accompanying drawings is fully incorporated herein by reference.

SUMMARY OF THE INVENTION

The shortcomings of the prior art are overcome and additional advantages are provided through the provision of a decimal multiplication mechanism for fixed and floating point mechanism of a computer and particularly to a system and process using such a mechanism without resulting leading zero detection (LZD) employing a decimal multiply instruction and using post normalization while allowing a shorter process to compute the final normalized product to be within the precision and range of a given format.

System and computer implemented methods corresponding to the described mechanisms are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which simplifies and reduces the number of cycles for the post processing of the final product result by eliminating large pieces of logic. Implementation of the invention is also less error prone, as less logic is required to perform the final determination. In addition, it also eliminates the retention of least significant digits that would normally be truncated, further saving hardware area and complexity.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Turning now to the exemplary embodiment in greater detail, it will be seen that this invention deals with the described process useful for decimal multiplication for fixed and floating point processors which assumes that the final product will be M+N digits in length and performs all calculations based on this assumption. Least significant digits that would be truncated are no longer stored, but retained as sticky information which is used to finalize the result product. Once the computation of the product is complete, a final check based on the examination of key bits observed during partial product accumulation is used to determine if the final product is truly M+N digits in length, or M+N−1 digits. If the latter is true, then corrective one digit shifting is employed to obtain the proper result. This eliminates the need for dedicated leading zero detection hardware used to determine the number of significant digits in the final product.

Figure 1:
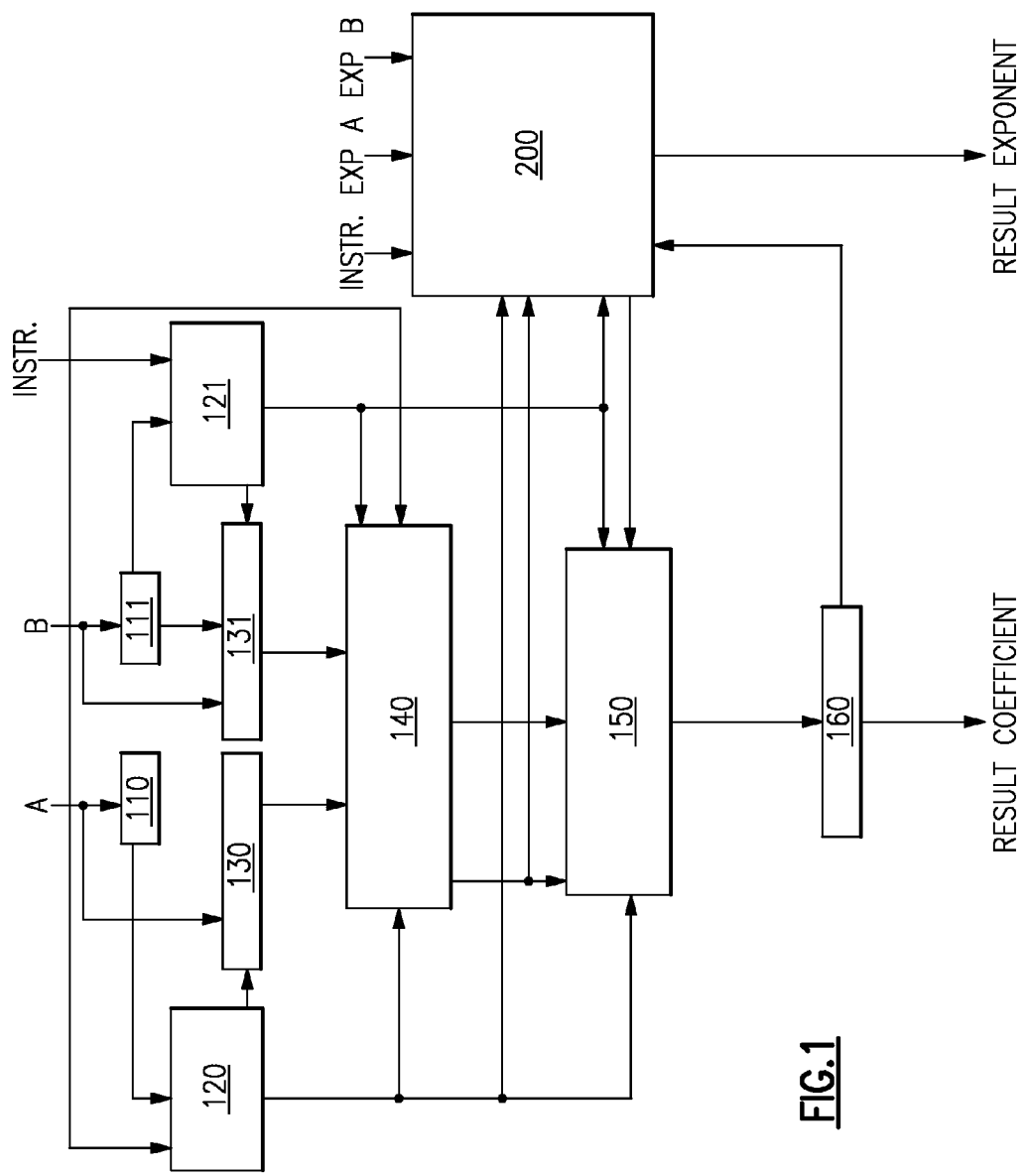
FIG. 1 illustrates the coefficient dataflow system of our exemplary embodiment.

The coefficient dataflow system to produce the final product coefficient is the left aligned coefficient process exemplified by FIG. 1.

Inputs operands are A and B and an instruction. The instruction basically determines the length of the format precision of the operation, which in the write is either 16 or 34 digits, but can be any size. Xmax and Xmin plus supernormal/subnormal ranges are also a function of the instruction, where Xmax and Xmin are the largest and smallest representable exponent for a given format.

The coefficient of A and B is fed into a leading zero detect register logic, with leading zero detect for multiplier 110 and leading zero detect for multiplicand 111 respectfully. These units send over information to a multiplier shift left/'m' value generator 120 and a multiplicand shift left/'n' value generator 121 to compute the number of digits to shift the coefficient of multiplier A and multiplicand B respectfully, which is fed into a multiplier left shifter 130 and a multiplicand left shifter 131, the left shifters for coefficients A and B respectfully. Multiplier shift left/'m' value generator 120 and the multiplicand shift left/'n' value generator 121 also generate m and n, the number of significant digits in coefficients A and B respectfully. The instruction input is needed to determine p such that m and n can be correctly determined.

Outputs of the multiplier left shifter 130 and the multiplicand left shifter 131 are the coefficients of A and B left aligned. They are fed into the iterative product generator 140. Iterative product generator 140 also takes in the instruction, to determine the desired format precision value "p", and also m and n, the lengths of both operands, received from the multiplier shift left/'m' value generator 120 and the multiplicand shift left/'n' value generator 121. Iterative product generator 140 determines which is larger, m or n, and takes the value from that one of the multiplier left shifter 130 or the multiplicand left shifter 131 that has the larger number of significant digits and uses that selection to generate multiples of 0×, 1×, 2×, 5× and 10×. The left-aligned operand that has a less number of significant digits is iterated upon. As in the Carlough reference above, a digit at a time is shifted off, and its partial product sum is generated using the 0, 1, 2, 5 and 10 multiples. This sequence is described detail below.

The notable differences of iterative product generator 140 from the Carlough referenced data flow is that
1—the operands are left aligned—Carlough's are right aligned
2—the partial products remain left aligned, and grow only to the right—Carlough's grow left and right, storing the first m digits in one register and the latter n digits in another
3—any least signficant digits (LSD) outside the precision of the target are shifted off the right hand side of an accumulation register; sticky information however is retained for rounding later on—Carlough retains all the digits produced.
4—the result of the coefficient generation is left aligned—Carlough's is right aligned At this point the Carlough reference would need to perform several shift and register transfer operations to obtain the final result. In the present invention, there is only one more step to produce the correctly aligned coefficient for the product.

Outputs of iterative product generator 140 are the left aligned coefficient plus an indicator if the most significant digit is zero or non-zero. This information is passed into a final product right shifter 150, which computes the final right shift amount and executes it. This final product right shifter 150 takes inputs m, n and the instruction to obtain the precision p. It also takes information from the exponent dataflow accumulator logic, described in FIG. 2 and shown as the exponent dataflow accumulator logic box 200 in FIG. 1, which records a value called exp_delta. Based on the scenarios described and these inputs, the final, single shift right value is computed and executed in final product right shifter 150. The output of iterative product generator 140 also sends the most significant digit (MSD) zero/non-zero information to the exponent dataflow accumulator logic 200, as this is what is used to determine if the final coefficient had m+n or m+n−1 digits, which is also needed when computing the final exponent in the exponent dataflow accumulator logic 200.

The output of final product right shifter 150 is the right shifted coefficient, with the least significant digit (LSD) in the correct position, and guard/and sticky bit information to the right of the LSD. This information can then be passed onto a decimal rounder 160, which rounds the coefficient with guard and sticky bit information and produces a final product coefficient. The decimal rounder 160 sends another output signal to exponent dataflow accumulator logic 200, which indicates whether or not the final product coefficient value was right shifted to account for a carry out of p digits, like with 999 . . . 99 rounds to 10000 . . . 00, etc. The decimal rounder 160 does this rounding and shifting.

Figure 2:
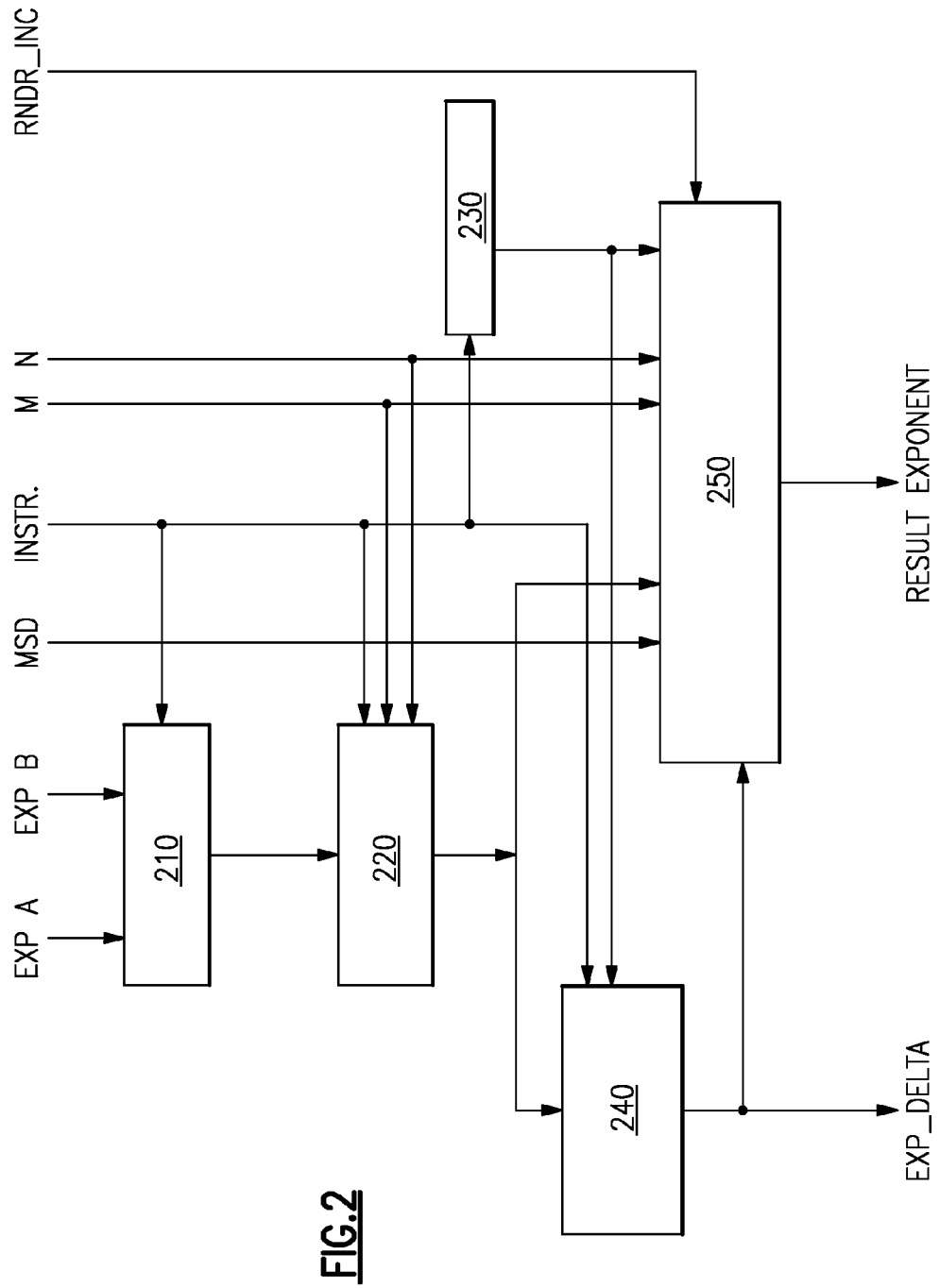
FIG. 2 shows detail of the exponent dataflow accumulator logic of the coefficient dataflow of FIG. 1.

FIG. 2 illustrates is the exponent dataflow accumulator logic 200 in more detail. It takes as inputs the instruction, the exponent of A and B, m, n MSD and rounder_increment and outputs the result exponent and the exp_delta value.

This exponent dataflow accumulator logic 200 includes an ideal exponent calculator 210 which is coupled to receive the exponents of A and B and the instruction. This ideal exponent calculator 210 computes the ideal exponent of the multiplication, which is the sum of the exponents. It needs the instruction to compute the proper sum, as the exponents are biased, and a bias must be subtracted out to achieve the correct result. Output of the ideal exponent calculator 210 is the ideal exponent, which output is sent to an ideal exponent adjustor 220.

This ideal exponent adjustor 220 adjust the ideal exponent if the sum of m+n is greater than p. It therefore also takes in inputs m, n and the instruction. It then increments the ideal exponent by (m+n)−p. It outputs this potentially incremented ideal exponent.

The instruction information goes to exponent constant generator 230, which produces Xmin, Xmax, Dmin exponents which are only based on the instruction.

Output of ideal exponent adjustor 220 goes into an exponent delta generator 240, which also takes in the instruction to obtain the precision p, and also some constants from constant generator 230, namely, Xmin and Xmax. The value of exp_delta is used to adjust the final right shift amount in final product right shifter 150 when the result is near the subnormal or supernormal range. This calculation is described below. The output of exponent delta generator 240 provides the value exp_delta to final product right shifter 150. The final exponent calculator 250 is the device that computes the final result exponent. It takes the ideal exponent from the ideal exponent adjustor 220, a selection of constants from constant generator 230, rounder increment, m, n, MSD and the exp_delta value from the exponent delta generator 240. The final result exponent is computed and selected here.

The capabilities of the present invention implemented in hardware can be achieved by a combination with firmware or software. The process of implementing the invention in our preferred embodiment for a decimal multiplication unit following the steps described below for decimal multiplication as a process flow using an IBM® zArchitecture® unit.

In an IBM zArchitecture illustration we would define:
Operand A: as having n significant digits with exponent $e\hat{}a$;
Operand B: as having m significant digits with exponent $e\hat{}b$; while a Final product: of m+n OR m+n−1 significant digits in length, has $e\hat{}(a+b)$.

The format precision: p would be for the IBM zArchitecture, p=16 for long and p=34 for extended precision.

Leading zero detect: lzd

Exponent delta: is the value, exp_delta, which is the additional amount needed to shift the product coefficient when the resulted exponent is at the extremes.

===========================================

Note: The invention performs all calculations before the final rounding step assuming that the result will be m+n digits in length. A length of m+n−1 digits is determined once the final product has been produced and selection of the appropriate results ensues.

The process for product coefficient generation includes the following steps.

Step 1: Determine which Operand has the Least Number of Significant Digits.

The algorithm iteratively sums partial product pairs, gradually producing the final sum of all the partial products.

A partial product example can be illustrated:

```
   12345
   × 67
   ─────
   86415  ← first partial product (PP)
  74070   ← second partial product (PP)
```

The sum of the two partial products (abbreviated PP) above produces the final resultant product. This algorithm uses partial product pairs to quickly produce the partial products of 1× through 10× for the operand with the larger number of significant digits.

In the example above, the first partial product is computed by adding 5× and 2× of the longer operand (12345) to product a product that is 7×. The second partial product is computed by adding 5× and 1× of the longer operand to product a product that is 6×.

The following table shows how all ten partial product possibilities are calculated by only storing 1×, 2×, 5× and 10× versions of the longer operand:

| PP1 | PP2 | Operation | Sum of PP1 and PP2 |
|-----|-----|-----------|--------------------|
| 0×  | 1×  | +         | 1×                 |
| 0×  | 2×  | +         | 2×                 |
| 5×  | 2×  | −         | 3×                 |
| 5×  | 1×  | −         | 4×                 |
| 5×  | 0×  | +         | 5×                 |
| 5×  | 1×  | +         | 6×                 |
| 5×  | 2×  | +         | 7×                 |
| 10× | 2×  | −         | 8×                 |
| 10× | 1×  | −         | 9×                 |
| 10× | 0×  | +         | 10×                |

Partial products 2 and 5 are computed quickly using doubler and quintupler circuits. 1× is loaded directly from a multiplier accumulator (mac) of decimal unit a1, and 10× is produced by performing a 1 digit left shift of the stored valued for partial product 1.

Determination of the operand with the smaller number of significant digits allows for the minimal number of iterations, as the partial products are selected based on the digits in the operand with the smaller length.

Once this step is completed, the decimal unit a1 and decimal unit b1 contain the following:

the mac for decimal unit a1 (dua1_mac) contains the operand with the larger number of significant digits, and the mac for decimal unit b1 (dub1_mac) contains the operand with the smaller number of significant digits.

Step 2: Parallel Preparation Before Iteration

The operand with the larger number of significant digits, now residing in dua1_mac, is normalized such that when the partial product 1 register in the decimal units mac is loaded, it can accommodate 1× and 10× multiples, 10× being computed by a 1 digit shift to the left.

dua1_mac is left shifted by the lzd of the larger operand taken from either operand A or operand B, determined before the swap left shift amt=p−n=lzd(n)

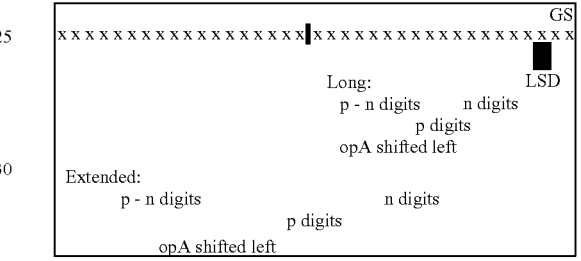

The above table shows contents of dua1_mac before and after left shifting for long and extended operands.

In parallel, the operand with the smaller number of significant digits, residing in dub1_mac, is passed through the dataflow to dur4_mac. During the iterative process of the algorithm, dur4_mac will be right shifted to produce a new next digit each cycle.

Step 3: Iterate Until m+n Digits of Precision are Produced for the Product Coefficient.

For long format multiplies, 2 partial product digits are retired every 2 cycles for a net of 1 partial product digit per cycle. The long format iterative process exploits the separate high and low parts of the dataflow registers, allowing for the 1 digit per cycle performance.

Long multiplication retires 2 digits every 2 cycles.

|       | cycle: | | | | | | | | | | | | | |
|-------|---|---|---|---|---|---|---|---|---|---|---|---|---|---|
|       | 1 | 2 | 3 | 4 | 5 | 6 | 7 | 8 | 9 | 10 | 11 | 12 | 13 | 14 |
| a1 hi |   |   |   |   |   |   | SP1 |   |   | SP12 |   |   |   |   |
| a1 lo |   |   | PP1 | PP2 |   |   |   |   |   |   |   |   |   |   |
| b1 hi |   |   |   |   |   |   | SP2 |   |   | "0000" |   | >>SP12 |   | >>SP1...4 |
| b1 lo |   |   | PP1 | PP2 |   |   |   |   |   |   |   |   |   |   |
| r3 hi | b1_out |   |   |   |   |   | SP1 |   | SP12 |   |   |   |   |   |
| r3 lo | b1_out |   |   |   |   | SP1 | SP2 |   |   |   |   |   |   |   |
| r4 hi |   | b1_out | >>1 | >>1 |   |   |   |   |   |   |   |   |   |   |
| r4 lo |   | b1_out | >>1 | >>1 |   |   |   |   |   |   |   |   |   |   |

The example in the table above shows how four partial product digits yield the sum of partial products in the 14$^{th}$ cycle. In this case, m is even. The first 2 partial product sums are available, shifted 2 digits to the right (denoted by >>), in cycle 12.

Since long format multiplies always retire 2 digits every two cycles, the number of iterative cycles is forced to always be even, even if m is odd. If m is odd, the alignment of the final partial product will be different that if m were even—it will be aligned 1 digit to the left.

For extended format multiplies, 1 digit is retired every 2 cycles for a net of ½ partial product digit per cycle.

Extended multiplication retires 1 digit every 2 cycles.

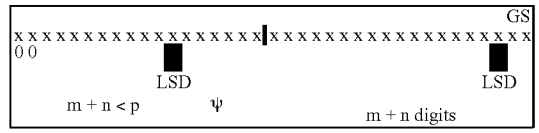

m + n < p, m even

| | cycle: | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| a1 hi | | | | | | | | | | | | | | |
| a1 lo | | | PP1 | | PP2 | SP1 | | SP2 | | | | | | |
| b1 hi | | | | | | | | | | | | | | |
| b1 lo | | | PP1 | | PP2 | "0000" | | >SP1 | | >SP12 | | >SP123 | | >SP1...4 |
| r3 hi | b1_out | | | | | | | | | | | | | |
| r3 lo | b1_out | | | | SP1 | | SP2 | | | | | | | |
| r4 hi | | b1_out | hold | >>1 | hold | >>1 | hold | | | | | | | |
| r4 lo | | b1_out | hold | >>1 | hold | >>1 | hold | | | | | | | |

The example of the table above shows how four partial product digits yield the sum of partial products in the 14$^{th}$ cycle. The first partial product sum is available, shifted 1 digit to the right (denoted by >), in cycle 8.

Upon completion of the iterate step, the unrounded product will reside in dua1_mac, left aligned for both long and extended formats. Step 4 shows the alignment of data in dua1_mac at this point.

Step 4: Prepare for Rounding

Long format: The product resides left aligned in the upper part of the dub1 register and must be shifted to the lower part of the register.

During this shift, the guard and sticky digits are set to prepare for rounding. The guard, sticky and additional product digits beyond the representable p digits extends into the low part of dua1_mac, once the iterative process no longer needs to process partial product pairs in the low part of dua1_mac (see Step 3 diagram for long, cycle 7 and beyond). Furthermore, alignment of the product is in one of two places dependent on whether or not m (the number of significant digits of the operand in dur4_mac) is even or odd.

Extended format: The product is already aligned properly for m+n>=p digits, but must be adjusted for m+n<p digits. Guard and sticky bit digits reside in the correct location for m+n=36 digits, and additional digits produced are collected; stickiness is stored in control and forced into the dub1 sticky digit right before rounding There is no differentiation between even and odd values for m in the extended format.

Long Cases:

For all even cases, the most significant digit of the product resides in dua1_mac bit locations (8:11) before applying the final shift amount.

For all odd cases, the most significant digit of the product resides in dub1_mac bit locations (12:15) before applying the final shift amount.

For m+n<p digits in length, the product coefficient must be shifted p+1 digits to get it aligned the same way in the low part of dua1_mac. To have it aligned such that the least significant digit is in the proper place in the low part of dua1_mac (bit locations 134:137), an additional shift of ψ is applied:

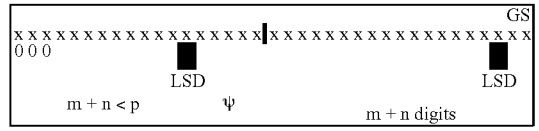

m + n < p, m odd

The final shift amount applied is therefore:

p+1+ψ
p+1+(p−(m+n))
2p+1−(m+n) digits to the right when m is even
p+ψ
p+(p−(m+n))
2p−(m+n) digits to the right when m is odd.

For m+n=p digits in length, the product coefficient must only be shifted p+1 digits to the right, as ψ in this case is zero, p digits if m is odd:

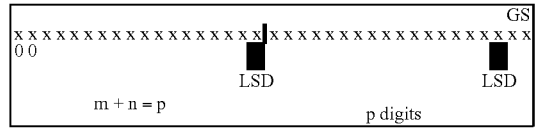

m + n = p, m even

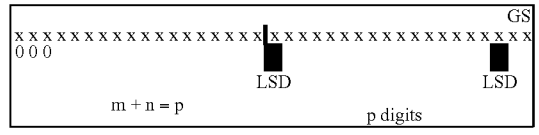

m + n = p, m odd

The final shift amount applied is:

2p+1−(m+n)

2p−p+1 p+1 digits to the right when m is even

2p−(m+n)

2p−p p digits to the right when m is odd

For m+n>p digits, we have digits outside the representable precision of the format. To only include the most significant p digits, we apply a shift right amount of p+1 digits. The digits outside of the precision, now residing in the low part of dua1_mac, will get shifted into the guard and sticky digit positions in the register. Any sticky information collected during the iterative process in will be ORed into the sticky digit, ensuring that rounding and IEEE flag setting is performed correctly:

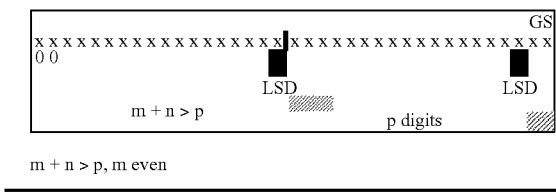

m + n > p, m even

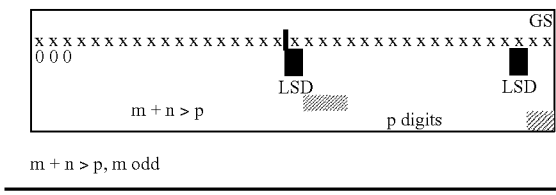

m + n > p, m odd

The final shift amount applied is:

2p+1−(m+n)

p+1 digits to the right when m is even

2p−(m+n)

p digits to the right when m is odd.

In summary, the right shift amounts when m is even:

m+n<p→2p+1−(m+n)

m+n>=p→p+1

And when m is odd:

m+n<p→2p−(m+n)

m+n>=p→p

Extended Cases:

For all even cases, the most significant digit of the product resides in dua1_mac bit locations (4:7) before applying the final shift amount.

During the extended algorithm, the entire precision of dua1_mac and all the other registers is utilized; the high and low parts of the registers are used together to store one number, unlike the long algorithm which isolates information between the high and low parts of the register.

For m+n<p digits, the product's coefficient is still left aligned and must be shifted such that its least significant digit is in locations (136:139).

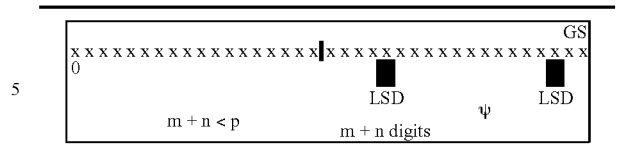

m+n<p

The final shift amount applied is:

ψ

(p−(m+n))

p−(m+n) digits to the right.

For m+n=p and m+n>p cases, no additional shift amounts need to be applied, as the product's coefficient already resides in the correct 34 digits. The guard and sticky bit are produced and placed into bit locations 140:147 directly out of the adder, shifted 1 digit to the right. Additional sticky information is collected in a sticky register (dumsc_mac) as it is produced and then forced into the sticky bit digit right before rounding.

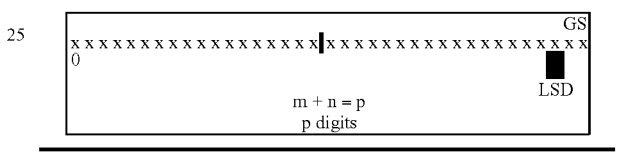

m+n=p

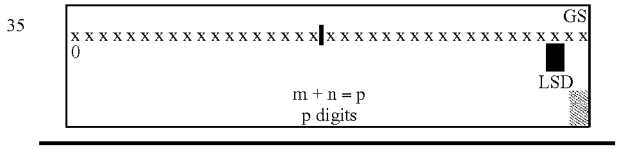

m+n>p

The final shift amount for these cases is:

p−(m+n)

p−p 0 digits to the right.

Step 5: Final Product Coefficient Length Correction for m+n or m+n−1 Digits

By analyzing the most significant digit of the final product coefficient, it can be determined if the result is m+n or m+n−1 digits in length.

Previous designs employed a leading zero detect of the result out of the adder, which would have added complexity and latency to the adder.

Analysis is actually performed on the most significant digits out of the adder of the multiplier unit (adr_mlt), as the adder input is shifted either 1 or 2 digits to the right before it is latched into dub1_mac, depending on extended or long formats, respectfully.

Long, m is even: adr_mlt bits (0:3)

Long, m is odd: adr_mlt bits (4:7)

Extended: adr_mlt bits (0:3)

If the bits analyzed are 0, the result is m+n−1 digits in length.

Since the final shift right amount was also calculated assuming m+n digits, it must be adjusted by 1 if the result is m+n−1 digits. However, this adjustment is only performed if m+n>p digits; no correction is applied otherwise.

No left shift left correction
(m+n digits long AND m+n>p) OR m+n<=p
In-gate rot_out (0:143) into dual_mac (4:146), with sticky bit information into dubl_mac(147)
MSD non-zero digit resides in dual_mac(4:7)
Left shift correction needed
m+n−1 digits AND m+n>p
In-gate rot_out (0:143) into dual_mac (0:143), dub1_mac (144:147) set with sticky bit information.
MSD non-zero digit resides in dual_mac(4:7); bits(0:3) are zero as the result was m+n−1 digits.

Furthermore, since the working exponent was also calculated using m+n digits in the final product, the final exponent selected is the working exponent decremented by one, Xwork−1.

Step 6: Rounding and Finishing

In the ffnm1 cycle (the cycle before the multicycle operation synchs up with the ffn, or F1 cycle of the pipeline), dua1_mac is zeroed out and dua1_mac contains the right shifted product coefficient, ready for rounding.

This information resides in the A1 (first) cycle of the adder.

Additional information such as the adder controls, rounding mode and tiny mask are applied as well.

The final, rounded product coefficient is valid in dur3_mac in the F3 cycle, and finally available in the compressed DPD (densely packed decimal) format in dur4_mac in the F4, or finish, cycle.

During rounding, the adder performs final shifting and exponent adjustment on the final product.

If the product rounds up to p+1 digits, the adder selects the p most significant digits for output and indicates to select the incremented ideal exponent.

There is also additional logic in duc2_mac which detects if the adder needed to increment a result that became p+1 digits and the working exponent is already at Xmax. If this occurs, an overflow condition exists and the appropriate handling logic is activated. Signals indicating the length of the final product (m+n or m+n−1 digits) are also employed.

Floating Point Versus Fixed Point Decimal Multiplication

The aforementioned coefficient product generation is used when computing the product for either a floating point or fixed point multiplication instruction.

In the IBM zArchitecture Fixed Point Decimal multiplication unit (DFU), the fixed point multiplication instruction, MP, uses either the long or extended algorithms described, depending on the length in memory of the input operands. The selection is made during the beginning cycles of execution of the instruction. To ensure that no extreme exponent handling is trigged, the bias is forced into the exponent fields during execution of the MP instruction.

Product Exponent Calculation

The ideal exponent for the multiplication of two operands is the sum of the two operands exponents:

$$OPAe^{expA} * OPBe^{expB} = OPA * OPBe^{(expA+expB)}$$

Step 1: Sum Operand Exponents and Subtract Out Bias

The operand exponents are summed together in an accumulator register duxab_mac. This sum contains two biases, as both operands contained the biased in their original representation. Thus, the format bias is subtracted from the raw sum of the two input operands in dux1_mac leaving the "working exponent," Xwork. The exponent is called "working" as it may undergo further adjustments as the algorithm progresses.

Step 2: Adjust the Working Exponent (Xwork) if m+n>p Digits

Control uses leading zero detect information from operand A and operand B to compute their respective lengths and thus, the length of the final product. That information then determines if m+n is greater that the precision of the format, p. If it is, then the working exponent is adjusted as follows:

$$m+n>p: X\text{work}=X\text{work}+((m+n)-p)$$

$$m+n<=p: X\text{work}=X\text{work}+0$$

At this point, information on the exponent is generated:
Xwork==0 (exponent is small condition)
Xwork<0 (exponent is small condition)
Xwork<(Xmin+p) (exponent is small condition)
Xwork==Xmax (exponent is big condition)
Xwork>Xmax (exponent is big condition)
This information is computed in dux2_mac.

The working exponent is held; no further adjustments are made to this latched value. However, the following potential result exponents are generated based off of the current working exponent:

Xwork+1: incremented working exponent, selected if adder
rounds to p+1 digits.

Xwork−1: decremented working exponent, selected if final result is determined to be m+n−1 digits instead of m+n digits.

The constants for Xmin and Xmax are stored and available on the fly.

For overflow or underflow cases that require an exponent of Xmin or Xmax, those values are obtained from exponent constant selection, not additional adjustment of the working exponent.

Step 3: Extreme Exponent Handling

Adjust final right shift of the product coefficient amount before rounding for cases where the exponent is big or small such that the final result exponent is within the range of the format.

Ideal exponent<Xmin, provide shifts right to get result exponent to Xmin

Ideal exponent>Xmax, provide shifts left to get result exponent to Xmax, if there are leading zeroes in the result's product's coefficient The final product's coefficient may need to be adjusted when the result exponent is near the two exponent extremes, Xmax and Xmin:

Xwork<Xmin (exponent negative)
Xmin<=Xwork<Xmin+p (exponent in subnormal range)
Xmin+p<=Xwork<=Xmax (exponent in normal range)
No adjustment of the product coefficient due to the exponent
Xmax+1==Xwork (exponent at Xmax+1)
Xmax+1<Xwork<Xmax+p (exponent large)
Xmax+p<=Xwork (exponent very large)

Adjusting the final right shift amount before rounding based on the value of the working exponent is the same for long and extended format.

The adjustment of the final product's coefficient is performed at the same time the left aligned product coefficient data in dua1_mac is being shifted to the right for rounding. This adjustment to the shift right amount is called the exp_delta. Therefore, the final right shift amount equation becomes:

$$2p-(m+n)-\text{exp\_delta}$$

where exp_delta is used to adjust the final right shift amount to obtain the correct product coefficient One shift right amount needed to prepare data for rounding and completion:
Right Align LSD
Adjust product coefficient if ideal exponent is beyond the extreme exponents
Xwork<Xmin, Exponent is Negative
IEEE underflow mask==0
The working exponent, represented in 2's complement notation, is negative. It becomes negative as we subtract out the format bias from the sum of the two operand exponents, (step 1 of the exponent calculation).
In order to represent the result within the range of the given format, the product coefficient is shifted an additional amount to the right to get the result exponent to Xmin.
If (Xmin−Xwork)<p, then the product coefficient is shifted an additional Δ digits to the right:

$2p-(m+n)-\text{exp\_delta}$ in this case, Δ is already negative in 2's compliment notation $2p-(m+n)+\Delta$

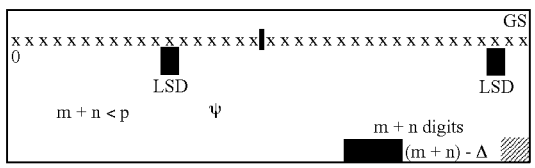

Example of additional Δ digit shift right to get to Xmin
If Xwork<Xmin−p, then all the digits in the precision are shifted into the sticky digit. A value of 36 is forced for the entire shift right equation (36 is used to force all rotated digits into sticky information in the rotator, durot_mac).
This is known as a "shift out of range" scenario.

$2p-(m+n)-\text{exp\_delta} \rightarrow 36 \text{ if } X\text{work} < X\text{min}-p$ Since the working exponent is negative, we definitely have a tiny, or underflow, condition. This condition is enabled via the control logic, but it is trigged by the tiny indicator out of the adder, set as a result of the rounding step. A tiny_mask is applied to the adder in the A1 cycle to determine if the result out of the adder is tiny or not.
For this case, the tiny_mask to the adder is setup with a value to guarantee that all digits in the resulting product will trigger the tiny condition. These constants (cnst) are:
tiny_mask=cnst
cnst=19 for long format (note, VHDL has 20!!!)
cnst=1 for extended format (note, VHDL has 2!!!!)
IEEE underflow mask==1
Calculation of the product coefficient and final right shifting before rounding ensues as usual.
exp_delta==0
An IEEE exception condition exists, the exception is triggered and the result returned is the rebiased result.
Xmin<=Xwork<Xmin+p, Exponent in the Subnormal Range
IEEE underflow mask==0
Products within this range do not need additional coefficient adjustment as the result exponent is greater than or equal to Xmin; exp_delta is set to zero
exp_delta==0
However, the result may by subnormal. Setup of the tiny_mask based on the result exponent will help the adder determine this condition tiny_mask=cnst+Xwork
subnormal (tiny) detection takes the result exponent and the number of digits in the final result
IEEE underflow mask==1
Calculation of the product coefficient and final right shifting before rounding ensues as usual.
exp_delta==0
An IEEE exception condition exists if the adder indicates a tiny condition. An exception is then triggered and the result returned is the rebiased result. Otherwise, the Xwork exponent becomes the result exponent.
Xmin+p<=Xwork<=Xmax, Exponent is in the Normal Range
This is the normal case. exp_delta will be equal to zero, as no additional adjustments to the product's coefficient are needed, regardless if the result is m+n or m+n−1 digits, and regardless of the format.
The m+n versus m+n−1 left shift of 1 digit result out of the rotator may still be applied if m+n>p digits
Since the tiny indicator is always activated during rounding in the adder, the tiny_mask is set with its maximal value of 34.
This means that no matter how many digits there are in the result, at least one of the digits will fall within the range of the tiny_mask, indicating a non-tiny condition
A zero result is not indicated as tiny.
Xmax+1==Xwork
IEEE overflow mask==0
If m+n<p:
In this case, there are leading zeroes in the product's coefficient.
An effective shift left is applied such that the final exponent is Xmax
Additional shift amount=Xwork−Xmax
1 in this case
This left shift amount is applied by subtracting it from the final right shift amount as the exp_delta term $2p-(m+n)-\text{exp\_delta}$ For this case, the right shift amount is now 1 less, allowing the product to effectively shift left the 1 digit to obtain a final exponent of Xmax.

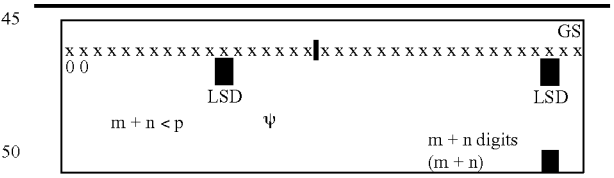

Final right shift amount adjusted by exp_delta, Δ=1, yielding the effective shift left of one.
The working exponent is not adjusted to become the final result exponent. Instead, the constant for Xmax is selected for the result.
No overflow condition occurs.
If m+n=p, then m+n−1<p and has 1 leading zero
The action to be taken is not known until it can be determined if the result product coefficient contains m+n or m+n−1 digits of precision.
If it contains m+n digits, we have an overflow condition, and Nmax or infinity is the result, selected based on the rounding mode.
There are no leading zeroes in the result product coefficient to perform the effective shift left.

If it contains m+n−1 digits, the result product coefficient is within the precision and range of the format, and no overflow occurs.

exp_delta=0

The final partial product summation is placed into dual_mac after being output from the adder. The most significant digit of the result, as described in the coefficient generation section, is analyzed and is used to determine if the result is m+n or m+n−1 digits in length.

If the MSD is zero, the result is m+n−1 digits in length

If the MSD is not zero, the result is m+n digits in length

If the result was m+n−1 digits, the result exponent is the constant for Xmax.

m+n>p

There are no leading zeroes to shift left regardless if the result had m+n or m+n−1 digits.

An overflow condition exists and the result is Nmax or infinity based on the rounding mode.

IEEE overflow mask==1

Whenever a big exponent condition exists with the IEEE overflow mask enabled, the multiply algorithm will always perform 2 final shift right actions, one right after the other, instead of the normal one final right shift action. This is done because there exists some conditions where it is not known until the final analysis to determine if the result contains m+n or m+n−1 digits in the result. The action taken—rebiasing or not—is dependent on the length of the final product coefficient. As a result, the first right shift rotation produces a rebiased result, and the second right shift rotation produces the non-rebiased result. A final selection between the two rounded outputs is made based on the m+n or m+n−1 determination.

First rotate amount:

exp_delta==0 (preparing for rebiasing; no coeff. adj.)

Second rotate amount:

exp_delta==0 (m+n>=p, no digits to shift left)

OR:

exp_delta==Xwork−Xmax (m+n<p, leading zeroes available)

If m+n<p:

Same as above; no overflow condition occurs.

If m+n=p, then m+n−1<p and has 1 leading zero.

The action to be taken is not known until it can be determined if the result product coefficient contains m+n or m+n−1 digits of precision.

If it contains m+n digits, we have an overflow condition

There are no leading zeroes in the result product coefficient to perform the effective shift left.

The first rotate amount is selected, as the overflow condition will lead to rebiasing of the exponent.

If it contains m+n−1 digits, the result product coefficient is within the precision and range of the format, and no overflow occurs.

The second rotate amount is selected, as the leading zero is exploited to effectively shift the product coefficient left.

If the result was m+n−1 digits, then the result exponent is the constant for Xmax.

m+n>p

There are no leading zeroes to shift left regardless if the result had m+n or m+n−1 digits.

An overflow condition exists and the result is the first rotated amount, as the condition rebiases the result exponent.

Xmax+1<Xwork<Xmax+p, Exponent Large; may Possibly Fit in the Precision and Range of the Format IEEE overflow mask==0

If m+n<p:

In this case, there are leading zeroes in the product's coefficient.

An effective shift left is applied such that the final exponent is Xmax

Additional shift amount=Xwork−Xmax

This left shift amount is applied by subtracting it from the final right shift amount as the exp_delta term:

2p−(m+n)−exp_delta.

2p−(m+n)−(Xwork−Xmax)

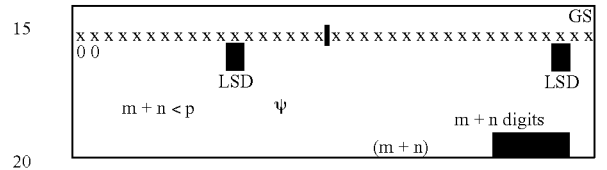

Final right shift amount adjusted by exp_delta, A (shown as the black rectangle in the Table of Line 00313), yielding the effective shift left A The working exponent is not adjusted to become the final result exponent. Instead, the constant for Xmax is selected for the result.

No overflow condition occurs provided that enough leading zeroes were available.

Overflow if (Xwork−Xmax)>(p−(m+n))

m+n>=p

There are not enough leading zeroes to shift left regardless if the result had m+n or m+n−1 digits.

An overflow condition exists and the result is Nmax or infinity based on the rounding mode IEEE overflow mask==1

First rotate amount:

exp_delta==0 (preparing for rebiasing; no coeff. adj.)

Second rotate amount:

exp_delta==0 (m+n>=p, no digits to shift left)

OR:

exp_delta==Xwork−Xmax (m+n<p, leading zeroes available)

If m+n<p:

Same as above; overflow condition occurs if:

(Xwork−Xmax)>(p−(m+n))

Select the first rotate amount if overflow occurs, second is it does not m+n>=p

There are not enough leading zeroes to shift left regardless if the result had m+n or m+n−1 digits.

An overflow condition exists and the result is the first rotated amount, as the condition rebiases the result exponent.

Xmax+p<=Xwork, Exponent is Very Large and Cannot Fit in the Result Format Precision and Range.

An overflow condition always exists.

There are never enough leading zeroes in the final result product coefficient to perform an effective shift left of the coefficient to get the result exponent down to Xmax.

Select the rebiased amount.

Select the first shift amount out of the rotator, performing the m+n−1 coefficient adjustment if m+n>p, if necessary.

As one example, one or more aspects of the present invention can be included in an article of manufacture (e.g., one or more computer program products) having, for instance, computer usable media or program storage device readable by a computer on which some program or firmware code for implementing the process is recorded. The media has embodied therein, for instance, computer readable program code means for providing and facilitating the capabilities of the present invention. The article of manufacture can be included as a part of a computer system or sold separately.

The flow diagrams depicted herein are examples. There may be many variations to these diagrams or the steps (or operations) described therein without departing from the spirit of the invention. For instance, the steps may be performed in a differing order, or steps may be added, deleted or modified. All of these variations are considered a part of the claimed invention, as while the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for performing decimal multiplication, the system comprising:
    operand registers storing a multiplier A and a multiplicand B as operands, wherein the multiplier includes one or more digits;
    left shifters coupled to the operand registers for said multiplier and multiplicand;
    a coefficient generation mechanism for generating the coefficients A and B of the multiplier and multiplicand, and for outputting coefficients of the multiplier and multiplicand and also generating m and n, the number of significant digits in coefficients A and B respectfully;
    an iterative product generation mechanism including adders and multiples circuitry coupled to the coefficient generation mechanism, with a result product digits accumulation register connected to the adders, determining which operand has the least number of significant digits, and iteratively producing sums of partial product pairs, gradually producing a final result product by accumulating the sum of all the partial products, while:
    performing all calculations for each of the digits in the multiplier in order from least significant digit to most significant digit before a final rounding step assuming that the coefficient of the final result product will be m+n digits in length while least significant digits that would be truncated are not stored, but retained as sticky information which is used to finalize said final result product, and
    creating a partial product of the digit and the multiplicand; and
    adding the partial product to the running sum; and
    outputting the running sum as the result of multiplying the multiplier and the multiplicand; and,
    once the computation of the final result product is complete, a final check based on the examination of key bits observed during partial product accumulation is used to determine if the final result product coefficient is truly M+N digits in length, or M+N−1 digits, and if M+N−1 digits length is true, then employing corrective one digit shifting to obtain the proper final result.

2. The system for performing decimal multiplication according to claim 1 wherein a shifter provides left shifting of the input operands before sending them into said coefficient generator.

3. The system for performing decimal multiplication according to claim 1 wherein said coefficient generator has a left aligned input and returns the most significant digit (MSD) as zero or not zero in addition to handling a left-aligned intermediate product.

4. The system for performing decimal multiplication according to claim 1 wherein outputs of said coefficient generator are a left aligned coefficient plus an indicator whether the most significant digit is zero or non-zero, which indicator is passed into a final product right shifter, which computes a final right shift amount and executes it.

5. The system for performing decimal multiplication according to claim 1 wherein the coefficient final product result only needs to be shifted once to the right with a final right shift amount to adjust for extreme exponents and right shift normalization after coefficient generation.

6. The system for performing decimal multiplication according to claim 5 wherein a computation of an exponent delta value is used to finalize an exponent and is added to the final right shift amount such that the coefficient of the final product has its least significant digit (LSD) in its correct place 7. The system for performing decimal multiplication according to claim 6 wherein any coefficient adjustment is beyond its extremes.

8. The system for performing decimal multiplication according to claim 1 wherein an exponent dataflow accumulator which includes an ideal exponent calculator which is coupled to receive the exponents of A and B and a format precision instruction, and which ideal exponent calculator computes an ideal exponent for the multiplication, which is the sum of the exponents.

9. The system for performing decimal multiplication according to claim 8 wherein the output of the ideal exponent calculator is an ideal exponent, which output is sent to an ideal exponent adjustor which adjusts the ideal exponent if the sum of m+n is greater than a defined format precision value "p", and wherein said ideal exponent adjustor also takes in inputs m, n and the format precision instruction and then increments the ideal exponent by (m+n)−p in order to output a potentially incremented ideal exponent.

10. The system for performing decimal multiplication according to claim 8 wherein no leading zero detection is used for extreme exponent handling and the coefficient for the final product only needs to be shifted once to the right to adjust for extreme exponents and right shift normalization after the coefficient generation.

11. A method for decimal multiplication, comprising:
    Storing a multiplier A and a multiplicand B as input operands, wherein the multiplier includes one or more digits, in operand registers;
    left shifting of the input operands before sending them into a coefficient generator;
    generating in said coefficient generator the coefficients A and B of the multiplier and multiplicand, and also generating m and n, the number of significant digits in coefficients A and B respectfully;
    iteratively producing sums of partial product pairs with an iterative product generation mechanism including adders and multiples circuitry coupled to the coefficient generation mechanism, and a result product digits accumulation register connected to the adders, after determining which operand has the least number of significant digits, and gradually producing a final result product by accumulating the sum of all the partial products, while:
    performing all calculations for each of the digits in the multiplier in order from least significant digit to most significant digit before a final rounding step assuming that the coefficient of the final result product will be m+n digits in length while least significant digits that would be truncated are not stored, but retained as sticky information which is used to finalize said final result product, and creating a partial product of the digit and the multiplicand; and adding the partial product to the running sum; and outputting the running sum as the result of multiplying the multiplier and the multiplicand; and, once the computation of the final result product is complete, executing a final check based on the examination of key bits observed during partial product accumulation to determine if the final result product coefficient is truly M+N digits in length, or M+N−1 digits, and if M+N−1 digits length is true, and then employing corrective one digit shifting to obtain the proper final result.

12. The method for performing decimal multiplication according to claim 11 wherein the final result product is a right shifted coefficient, with the least significant digit (LSD) in the correct position, and guard/and sticky bit information to the right of the LSD.

13. The method for performing decimal multiplication according to claim 11 wherein said coefficient generator has a left aligned input and returns the most significant digit (MSD) as zero or not zero in addition to handling a left-aligned intermediate product.

14. The method for performing decimal multiplication according to claim 11 wherein outputs of said coefficient generator are a left aligned coefficient plus an indicator whether the most significant digit is zero or non-zero, which indicator is passed into a final product right shifter, which computes a final right shift amount and executes it.

15. The method for performing decimal multiplication according to claim 11 wherein the coefficient final product result only needs to be shifted once to the right with a final right shift amount to adjust for extreme exponents and right shift normalization after coefficient generation.

16. The method for performing decimal multiplication according to claim 15 wherein a computation of an exponent delta value is used to finalize an exponent and is added to the final right shift amount such that the coefficient of the final product has its least significant digit (LSD) in its correct place.

17. The method for performing decimal multiplication according to claim 16 wherein any coefficient adjustment is beyond its extremes.

18. The method for performing decimal multiplication according to claim 11 wherein an exponent dataflow accumulator which includes an ideal exponent calculator which is coupled to receive the exponents of A and B and a format precision instruction, and which ideal exponent calculator computes an ideal exponent for the multiplication, which is the sum of the exponents.

19. The method for performing decimal multiplication according to claim 18 wherein the output of the ideal exponent calculator is an ideal exponent, which output is sent to an ideal exponent adjustor which adjusts the ideal exponent if the sum of m+n is greater than a defined format precision value "p", and wherein said ideal exponent adjustor also takes in inputs m, n and the format precision instruction and then increments the ideal exponent by (m+n)−p in order to output a potentially incremented ideal exponent.

20. The method for performing decimal multiplication according to claim 18 wherein no leading zero detection is used for extreme exponent handling and the coefficient for the final product only needs to be shifted once to the right to adjust for extreme exponents and right shift normalization after the coefficient generation.

* * * * *